United States Patent
Konda et al.

(10) Patent No.: US 7,198,291 B2
(45) Date of Patent: Apr. 3, 2007

(54) PASSENGER PROTECTION APPARATUS

(75) Inventors: Tomoko Konda, Tokyo (JP); Kazuki Sakata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/288,466

(22) Filed: Nov. 6, 2002

(65) Prior Publication Data

US 2003/0230879 A1 Dec. 18, 2003

(30) Foreign Application Priority Data

Jun. 12, 2002 (JP) .............................. 2002-171335

(51) Int. Cl.
*B60R 21/01* (2006.01)
*B60R 21/32* (2006.01)

(52) U.S. Cl. ........................................ 280/735; 701/45

(58) Field of Classification Search ................ 280/735; 701/45

See application file for complete search history.

(56) References Cited

U.S. PATENT DOCUMENTS

| | | | |
|---|---|---|---|
| 5,330,226 A * | 7/1994 | Gentry et al. ................ 280/735 |
| 5,398,185 A * | 3/1995 | Omura ........................ 701/45 |
| 5,624,132 A * | 4/1997 | Blackburn et al. .......... 280/735 |
| 6,014,602 A * | 1/2000 | Kithil et al. .................. 701/45 |
| 6,199,901 B1 * | 3/2001 | Iizuka ........................ 280/735 |
| 6,220,627 B1 | 4/2001 | Stanley |
| 6,487,483 B1 * | 11/2002 | Gillis .......................... 701/45 |

FOREIGN PATENT DOCUMENTS

| JP | 6-206514 | 7/1994 |
|---|---|---|
| JP | 10-44921 | 2/1998 |
| JP | 2000-016230 A | 1/2000 |
| JP | 2002-512145 A | 4/2002 |

* cited by examiner

*Primary Examiner*—Ruth Ilan
(74) *Attorney, Agent, or Firm*—Sughrue Mion, PLLC

(57) ABSTRACT

A passenger protection apparatus of a simple construction is capable of stably performing air bag control and preventing erroneous control due to objects such as passenger's hands, newspapers, etc., other than passenger' head. A collision detection part detects a collision of a vehicle, and an object detection part detects an object in a prescribed object detection area rearwardly of an air bag installation surface in the vehicle based on a signal from a sensor. An air bag control signal generation part controls the expansion of an air bag based on the detection results of the object detection part and the collision detection part. The air bag control signal generation part makes the air bag control signal into an expansion permission signal only when an object exists in the object detection area at the time of detection of the collision or within a predetermined time from the detection of the collision.

23 Claims, 15 Drawing Sheets

| CRASH SENSOR DETERMINATION RESULTS | PASSENGER DETECTION DEVICE DETERMINATION RESULTS | OPERATION OF AIR BAG |
|---|---|---|
| EXPANSION PERMISSION | EXPANSION PERMISSION | EXPANSION |
|  | EXPANSION PROHIBITION | NON-EXPANSION |
| EXPANSION PROHIBITION | EXPANSION PERMISSION |  |
|  | EXPANSION PROHIBITION |  |

FIG.5

| a. IN CASE OF OBJECT LYING REARWARDLY OF OBJECT DETECTION AREA | | | |
|---|---|---|---|
| COLLISION | OBJECT PASSING OVER OBJECT DETECTION AREA | PERMISSION OF AIR BAG EXPANSION | — |

— 114

| b. IN CASE OF OBJECT LYING WITHIN OBJECT DETECTION AREA | | | |
|---|---|---|---|
| COLLISION | PERMISSION OF AIR BAG EXPANSION | — | — |

— 115

| c. IN CASE OF OBJECT LYING FORWARDLY OF OBJECT DETECTION AREA | | | |
|---|---|---|---|
| COLLISION | — | — | — |

— 116

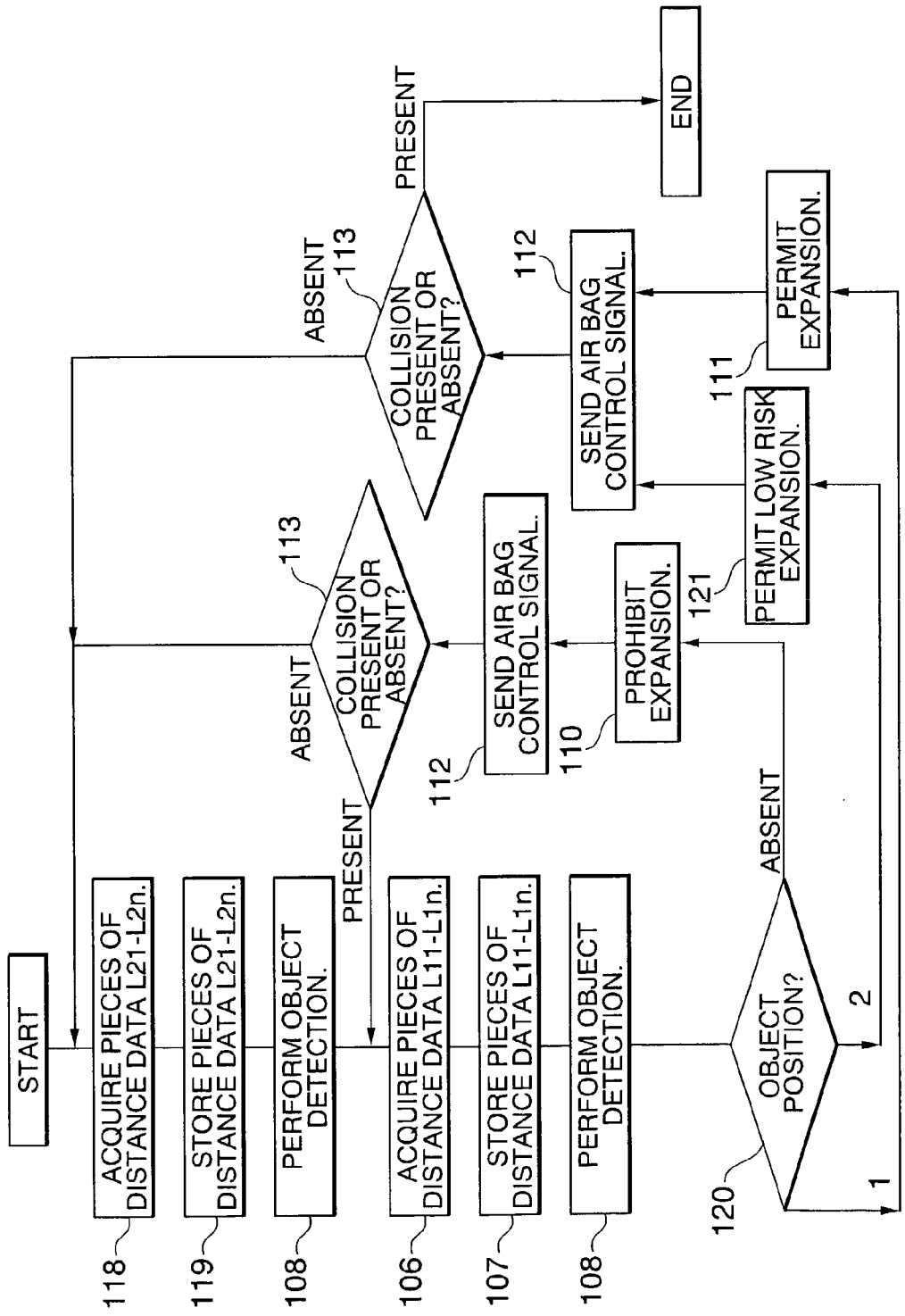

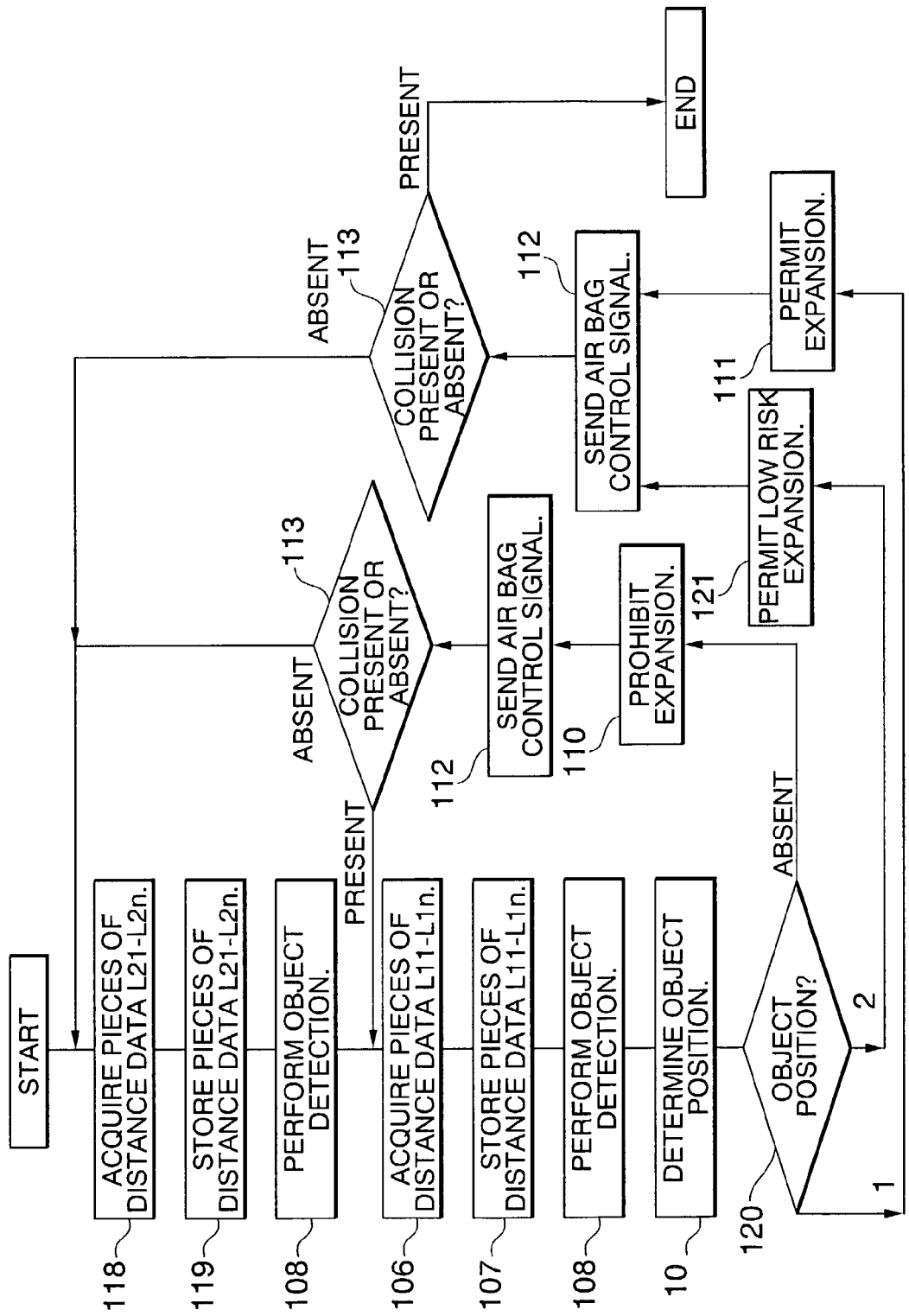

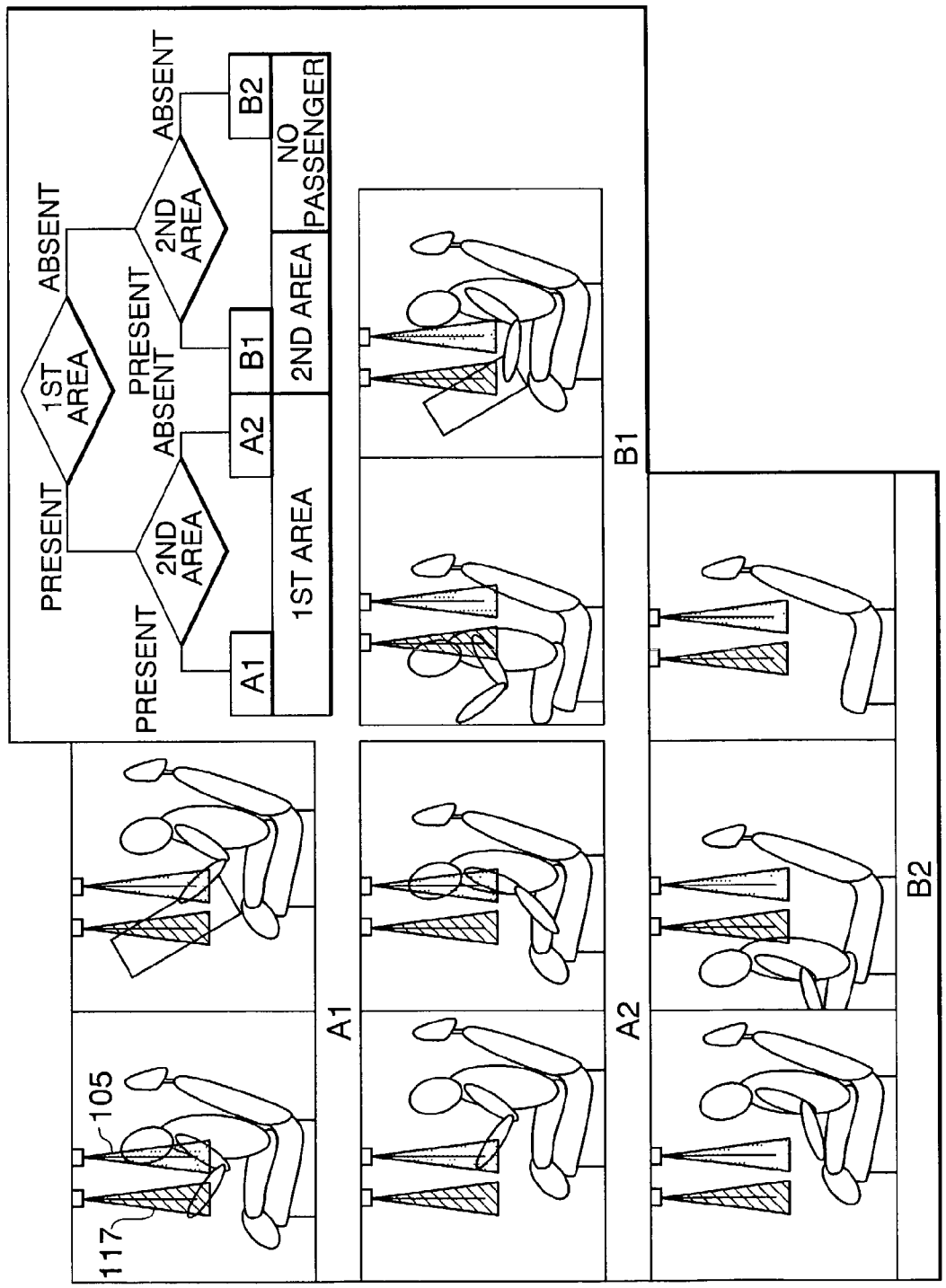

FIG.10

TABLE FOR DETERMINATION OF CURRENT PASSENGER POSITION

| P (CURRENT OBJECT POSITION) | Pb (PASSENGER POSITION BEFORE ONE CYCLE) | | | | | |
|---|---|---|---|---|---|---|
| | BEFORE 2ND AREA | 2ND AREA | 1ST AREA | AFTER 1ST AREA | NO PASSENGER |
| 1ST AREA | 1ST AREA ※a | 1ST AREA | 1ST AREA | 1ST AREA | 1ST AREA |
| 2ND AREA | 2ND AREA | 2ND AREA | 2ND AREA | 1ST AREA ※b | 2ND AREA |
| ABSENT | BEFORE 2ND AREA | BEFORE 2ND AREA | AFTER 1ST AREA | AFTER 1ST AREA | NO PASSENGER |

*AFTER 1ST AREA : REARWARDLY OF 1ST AREA
*BEFORE 2ND AREA : FORWARDLY OF 2ND AREA

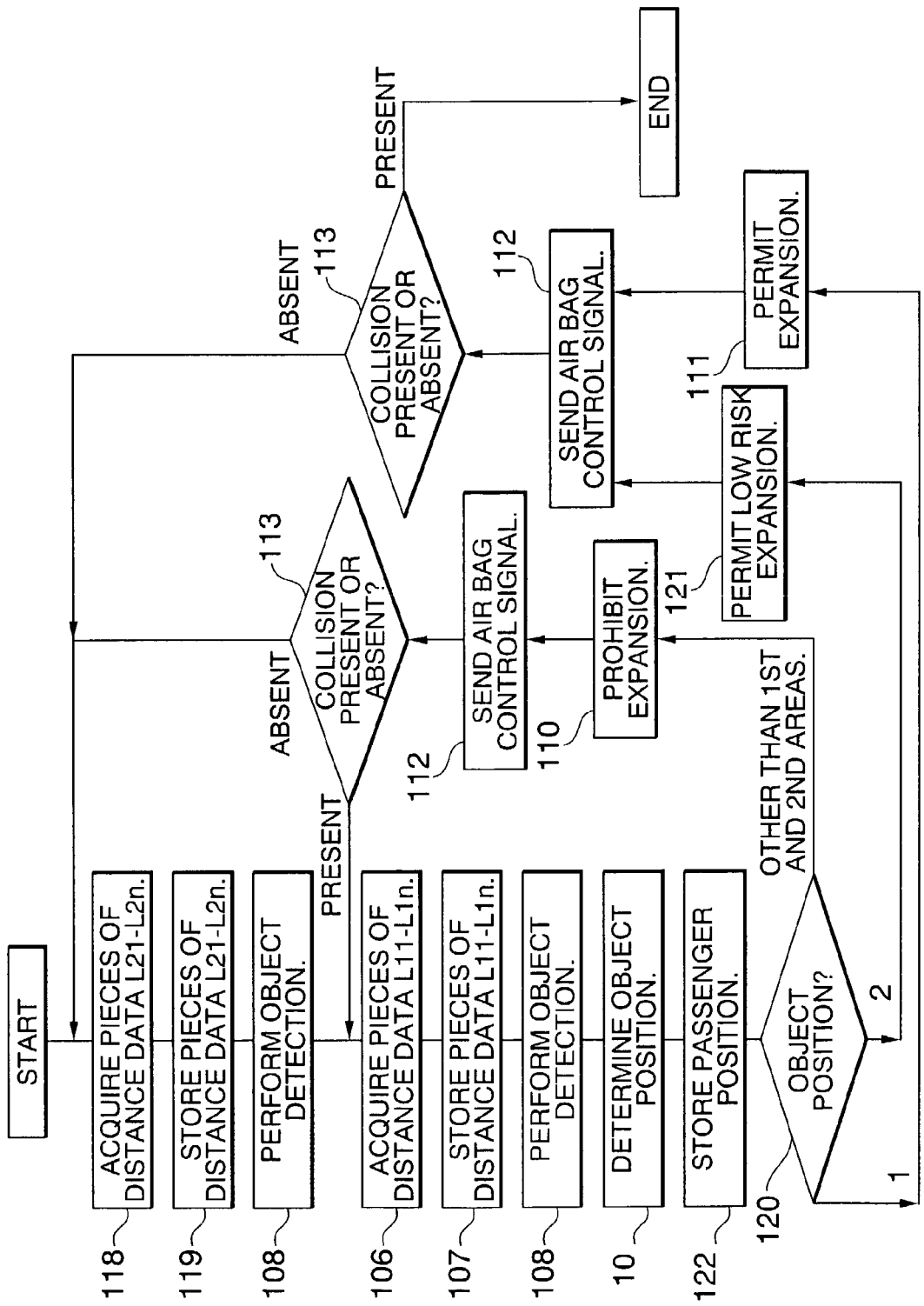

PASSENGER PROTECTION APPARATUS

BACKGROUND OF THE INVENTION

1. Field of the Invention

The present invention relates to a passenger protection apparatus which is capable of estimating the position of a passenger in a passenger's compartment of a vehicle thereby to control an air bag in an optimal manner.

2. Description of the Related Art

Conventional passenger detection or protection apparatuses are described for example in Japanese Patent Application Laid-Open No. 6-206514, Japanese Patent Application Laid-Open No. 10-44921, etc. Hereinafter, Japanese Patent Application Laid-Open No. 6-206514 and Japanese Patent Application Laid-Open No. 10-44921 will be described in detail.

As shown in FIG. 16, a passenger detection or protection apparatus disclosed in Japanese Patent Application Laid-Open No. 6-206514 includes a displacement sensor 60, which is mounted on a dashboard 24 for detecting the distance of a passenger or occupant 34 on a seat in a passenger's compartment from the storage position of an air bag 26, and an infrared sensor 70, which is mounted on the ceiling of the vehicle over the head of the passenger and has a plurality of fields of view VF1–VF8.

These sensors 60, 70 supply output signals corresponding to the distance of the passenger 34 to the stored air bag 26 to a control device 50, so that when at least one of these signals from the two sensors 60, 70 indicates that the passenger 34 is at a prescribed distance or more apart from the air bag storage position, the control device 50 sends an enable signal to a passenger restraint system 20 to make the air bag 26 into an operating state in which it is expandable. On the contrary, when the distances detected by both of these sensors 60, 70 are less than the prescribed distance, the control device 50 makes the air bag 26 into an inoperable state. That is, when the passenger 34 is close to the dashboard 24, the air bag 26 is controlled to prevent its expansion. Here, note that the level of the expansion of the air bag 26 may be controlled in accordance with the distance of the passenger 34 to the air bag, thus making it possible to control the passenger restraint system 20 in an appropriate manner.

In addition, in a passenger detection or protection apparatus disclosed in Japanese Patent Application Laid-Open No. 10-44921, as shown in FIG. 17, an air bag 26 is accommodated in an air bag accommodation part 3 of a dashboard 24 so that it is caused to inflate or expand like a balloon at the time of sudden deceleration, thereby protecting a passenger on a seat. In FIG. 17, a warning area 4 represents an area in which a high impact might be brought to the passenger upon expansion of the air bag 26. A range sensor (infrared sensor) 70 monitors whether there exists any person or object in the warning area 4. When anyone or anything continuously stays in the warning area 4 for longer than a predetermined period of time, a warning is output, or a related air bag system is controlled to prevent the air bag 26 from being opened or expanded even in case of sudden deceleration.

However, with the passenger protection apparatus of Japanese Patent Application Laid-Open No. 6-206514 as shown in FIG. 16, the specific distance of the passenger from the air bag storage position or expansion surface is detected or recognized so that the air bag 26 is intended to be controlled in accordance with the distance and the moving speed of the head of the passenger 34 (i.e., in actuality, the crash or collision position of the air bag 26 with the passenger 34 calculated or estimated from the distance and the moving speed of the passenger's head). Therefore, there might be a possibility that the sensors are of complicated constructions, and the amount of arithmetic calculations increases.

Moreover, although it is necessary to control the air bag 26 in accordance with the position of crash or collision between the air bag and the passenger's head, it is practically difficult to measure the moving speed of the passenger's head after the collision. In addition, the air bag control has not a one-to-one relation to the collision position of the air bag with the passenger's head, but there exists a certain extent of overlap therebetween, so there is a possibility that the exact collision position of the air bag with the passenger's head cannot be instantaneously determined or distinguished.

Furthermore, with the passenger protection apparatus as shown in Japanese Patent Application Laid-Open No. 10-44921, only a dangerous area is monitored so as to distinguish the passenger's head from his or her hands or other objects based on their staying time in which they continuously stay in the dangerous area. As a result, it might be unable to instantaneously determine or distinguish, upon collision, the incoming or entering of passenger's hands, a newspaper or the like into the dangerous area.

SUMMARY OF THE INVENTION

The present invention is intended to solve the problems as referred to above, and has for its object to provide a passenger protection apparatus which is capable of performing air bag control in a suitable manner with a system of a simple construction, as well as preventing erroneous or improper control with objects such as hands of a passenger, a newspaper or the like other than the head of the passenger.

Bearing the above object in mind, the present invention resides in a passenger protection apparatus which includes a collision detection part in the form of a crash sensor for detecting a collision of a vehicle, an object detection part in the form of a range sensor for detecting the existence of an object in a predetermined object detection region disposed rearwardly of an air bag installation surface in the vehicle based on a signal from a sensor, and an air bag control signal generation part for generating an air bag control signal to control the expansion of an air bag based on the detection results of the object detection part and the collision detection part. The air bag control signal generation part makes the air bag control signal into a control signal of expansion permission only when there exists an object in the object detection region at the instant when the collision of the vehicle is detected or within a predetermined period of time from the point in time of the collision of the vehicle. According to this arrangement, it is possible not only to suppress the expansion of the air bag for a passenger lying in a dangerous area but also to carry out air bag control for a passenger lying in a safe area without performing complicated arithmetic calculations.

In a preferred form of the present invention, the object detection region includes a plurality of object detection areas which are different in their distances from the air bag installation surface; the object detection part detects the existence of an object in each of the plurality of object detection areas. The air bag control signal generation part makes the air bag control signal into a control signal of low risk expansion to weaken the expansion force of the air bag when an object in an object detection area of a predetermined distance or less from the air bag installation surface is detected by the object detection part. The air bag control signal generation part makes the air bag control signal into a control signal of expansion permission when an object is detected in an object detection area of more than a prescribed distance from the air bag installation surface.

In another preferred form of the present invention, when the existence of objects in two or more object detection areas is detected, the object detection part determines that an object existing in the rearmost one of the object detection areas in the vehicle is a passenger.

In a further preferred form of the present invention, when time series object existence areas detected in at least two longitudinally continuously disposed object detection areas have moved from a forward area to a rearward area of the vehicle, the object detection part determines that the passenger has moved in a rearward direction of the vehicle, and in the reverse case, the object detection part determines that the passenger has moved in a forward direction of the vehicle.

In a still further preferred form of the present invention, when time series object existence areas detected in at least two longitudinally continuously disposed object detection areas have moved in a random order, the object detection part determines that the objected detected is not a passenger.

In a yet further preferred form of the present invention, the passenger protection apparatus further includes a position detection part for detecting the position of a back cushion of a seat. The object detection part enlarges a rear end of the object detection region in a rearward direction of the vehicle according to the position of the seat within a range in which the back cushion of the seat can not be detected.

In a preferred form of the present invention, the object detection part sets a lower end of the object detection region at a position higher than the height of the head of a six-year-old child dummy for use with a collision test seated on the seat.

In a preferred form of the present invention, the passenger protection apparatus further includes a brake detection part for detecting the presence or absence of brake application before the collision of the vehicle. The object detection region includes an object detection area of expansion permission in which the air bag expansion control signal is made into expansion permission, and a object detection area of low risk expansion in which the air bag expansion control signal is made into low risk expansion. When there is no brake application before the collision of the vehicle, the air bag control signal generation part enlarges the object detection area of expansion permission or the object detection area of low risk expansion in a forward direction of the vehicle by a predetermined distance from a usual position thereof for a predetermined period of time from the time at which the collision of the vehicle is detected.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 5 is an explanatory view illustrating the operation of an air bag in three patters according to the first embodiment of the present invention.

FIG. 7 is a flow chart illustrating the outline of processing according to the second embodiment of the present invention.

FIG. 8 is a flow chart illustrating the outline of processing according to a third embodiment of the present invention.

FIG. 9 is a view explaining the detection of objects according to the third embodiment of the present invention.

FIG. 10 is a view explaining the detection of objects according to a fourth embodiment of the present invention.

FIG. 11 is a flow chart showing the outline of processing according to the fourth embodiment of the present invention.

DESCRIPTION OF THE PREFERRED EMBODIMENTS

Hereinafter, preferred embodiments of the present invention will be described in detail while referring to the accompanying drawings. The same or corresponding parts or elements of the following embodiments as those of the above-mentioned conventional ones are identified by the same symbols.

Embodiment 1.

Figure 1A:
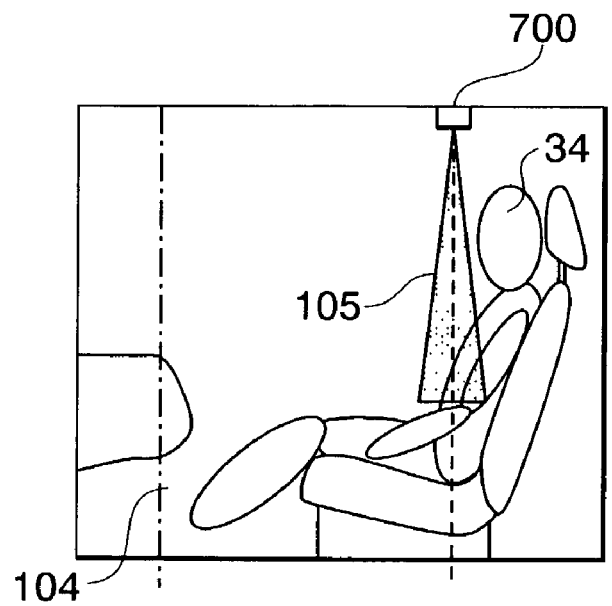
FIGS. 1A and 1B are a side elevational view and a front elevational view, respectively, showing a detection example in a passenger protection apparatus according to a first embodiment of the present invention.
Figure 1B:
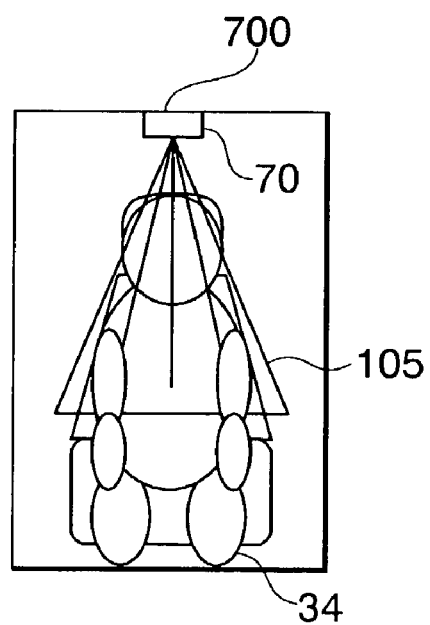
Figures 2, 3:
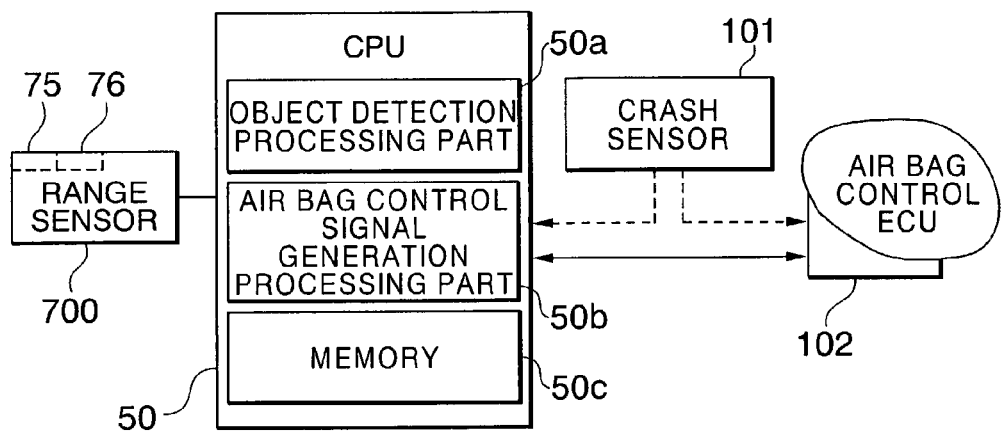
FIG. 2 is a view showing the configuration of the passenger protection apparatus according to the first embodiment of the present invention.
FIG. 3 is a view showing a example of combinations of the results of determinations made by a passenger detection device and a crash sensor according to the first embodiment of the present invention.

Now, a first embodiment of the present invention will be described below in detail. FIG. 1A is a side elevational view that shows a detection example of a passenger protection apparatus according to this embodiment, and FIG. 1B is a front elevational view thereof. FIG. 2 shows the configuration of the passenger protection apparatus according to the first embodiment of the present invention. In FIG. 1, a reference numeral 700 designates a range sensor having n pieces of object detection sensors 70 (though only one is illustrated) each in the form of an infrared sensor; 104 an air bag expansion or deployment surface; 105 an object detection area set by the object detection sensors 70; and 34 a passenger. In addition, the passenger protection apparatus shown in FIG. 2 includes the range sensor 700, a CPU 50 having an object detection processing part 50a, an air bag control signal generation processing part 50b, a memory 50c, etc., a vehicle-mounted crash sensor 101, and an air bag control ECU 102.

The passenger protection apparatus of this embodiment sets an object detection region composed of the object detection area 105 for detecting objects lying at a predetermined distance from an air bag (not shown, but may be installed in a dashboard, a steering wheel, or other appropriate portions of a vehicle) in a rearward direction of a vehicle on which the passenger protection apparatus is installed, by means of the n pieces of object detection sensors 70 which serve to detect the distances of the objects from the ceiling of the vehicle. Distance data including n pieces of data $L_{11}$–$L_{1n}$ detected by the object detection sensors 70, respectively, are stored in the memory 50c. When the crash sensor 101 detects a collision of the vehicle, the object detection processing part 50a determines based on the data stored in the memory 50c whether there is a passenger in the object detection area 105. Then, the air bag control signal generation processing part 50b generates an air bag control signal based on the determination of the object detection processing part 50a. Here, note that the air bag control signal generation processing part 50b may be distributed to the CPU 50 and the air bag control ECU 102.

The air bag control signal thus generated is finally sent to the air bag control ECU 102. Also, the crash or collision signal from the crash sensor 101 is sent to the CPU 50 and the air bag control ECU 102. The normal operation of the air bag is totally determined based on a combination of the determination result of the crash sensor 101 and the determination result of a passenger detection device or part composed of the object detection sensors 70, as shown in FIG. 3.

In FIG. 1, the object detection area 105 is set at such a distance that when the passenger 34 seated at a location rearwardly of the object detection area 105 is thrown out forward upon collision of the vehicle, the passenger 34 can be protected without any problem even if the air bag is expanded or deployed at the instant when the passenger 34 has arrived at the object detection area 105. It is thought that the position at which an impact is the greatest at the instant when the air bag is expanded or deployed is a position apart 5–7.5 centimeters (2–3 inches) from the air bag expansion or installation surface 104, that is, the surface at which the air bag is installed. The distance capable of protecting a passenger means a distance of the passenger from the air bag at which there is no possibility that the passenger collides with the air bag.

Figure 4:
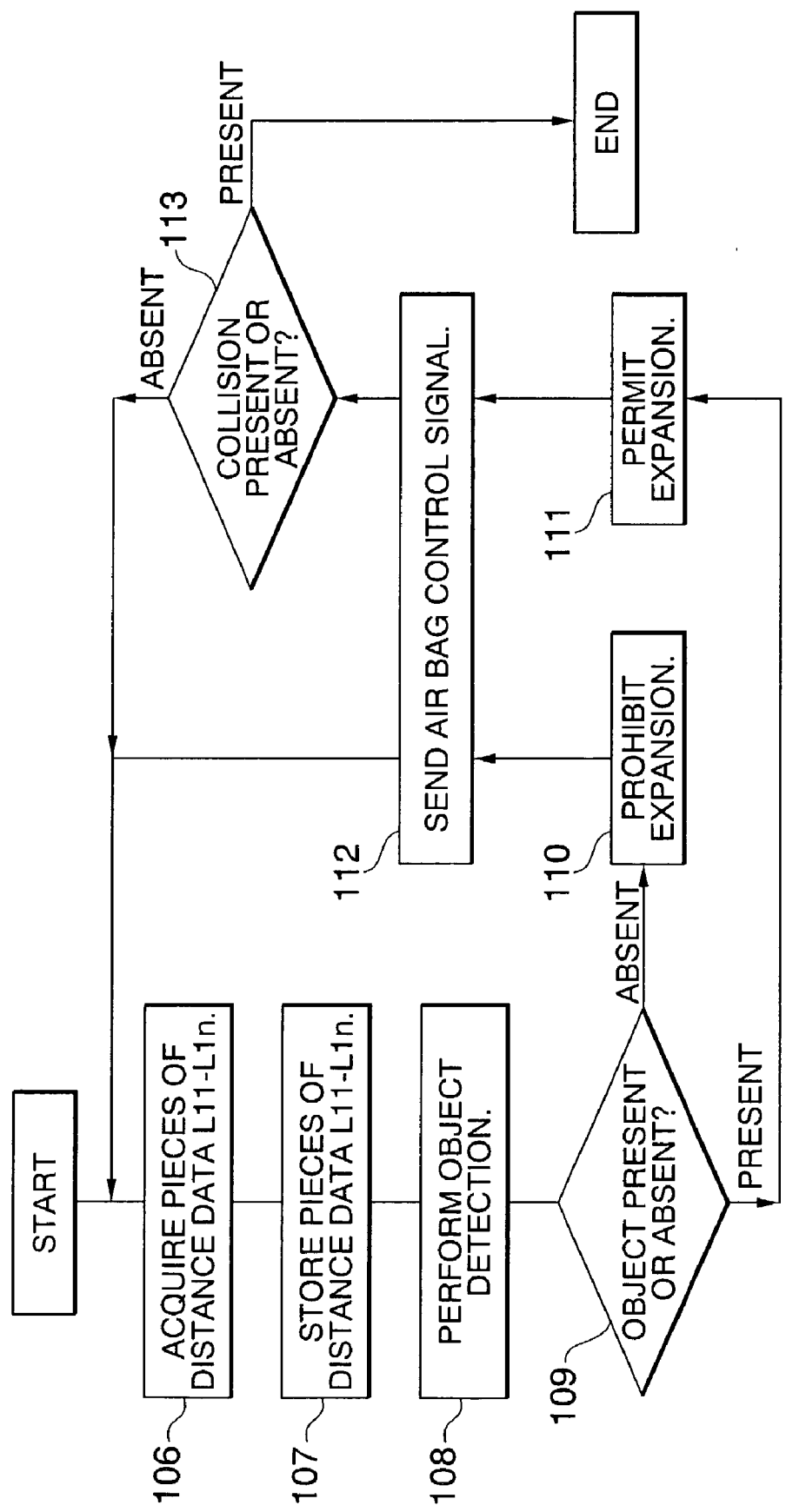
FIG. 4 is a flow chart illustrating the outline of processing according to the first embodiment of the present invention.

FIG. 4 is a flow chart that shows the outline of processing according to the first embodiment. As shown in FIG. 3, after the passenger protection apparatus is actuated, it sequentially acquires pieces of distance data $L_{11-1n}$ from the n pieces of object detection sensors 70 in step 106. The pieces of thus acquired distance data $L_{11-1n}$ are stored in the memory 50c in step 107, and they are used to detect objects in the object detection area 105 in step 108 (object detection means). An air bag control signal representative of expansion or deployment prohibition (or disabling) 110 or expansion or deployment permission (or enabling) 111 is generated in accordance with the result 109 of the detection of an object in the object detection area 105, that is, the presence or absence of an object.

The air bag control signal after generated is sent to the air bag control ECU 102 in step 112, and thereafter a return is performed to step 106. However, when there exists a passenger 34 in the object detection area 105, the presence or absence of a collision of the vehicle is determined in step 113. Only in the absence of a collision, a return to step 106 is carried out, whereas in the presence of a collision, an expansion permission or enabling signal is generated and the operation of the system or passenger protection apparatus is then terminated. As a result, the power consumption of the apparatus is reduced. In addition, a determination whether there exists a passenger in the object detection area 105 may be made only when a collision interrupt occurs. In the above manner, it is possible not only to suppress the expansion or deployment of the air bag for a passenger lying outside the object detection area but also to carry out air bag control for a passenger lying within the object detection area (safe area) in an easy and safe manner without performing complicated arithmetic calculations.

FIG. 5 shows examples of the operation of the apparatus in three patterns according to which one of existence areas an object in the form of a passenger's head lies in when a collision of the vehicle takes place. In cases where the passenger' head lies at a location rearwardly of the object detection area upon a collision of the vehicle, as shown at a reference numeral 114, an air bag control signal generated by the passenger protection apparatus represents expansion prohibition or disabling at the time of the collision. As a result, even if the expansion or deployment of the air bag is permitted by the crash sensor 101, the air bag does not expand. However, when the passenger' head is caused to move forward due to a vehicle collision, application of a brake or the like, passing through the object detection area, the air bag control signal from the passenger protection apparatus becomes expansion permissible or enabling, whereby the air bag starts expanding or deploying.

On the other hand, in cases where the passenger' head lies in the object detection area upon collision, as shown at a reference numeral 115, the air bag control signal from the passenger protection apparatus represents expansion permission or enabling at the time of the collision, so that the air bag immediately starts expanding. In cases where the passenger' head lies at a location forwardly of the object detection area upon collision, as shown at a reference numeral 116, the air bag control signal from the passenger protection apparatus represents expansion prohibition or disabling at the time of the collision. As a result, even if the expansion or deployment of the air bag is permitted by the crash sensor, the air bag does not expand or deploy. Thereafter, the passenger' head does not pass through the object detection area and hence the air bag remains unexpanded.

When any of the pieces of the distance data of the respective object detection sensors 70 constituting the range sensor 700 has changed from its initial value, the object detection means in step 108 of FIG. 4 makes a determination that there is an object in the detection area of the range sensor. If, however, the object detection area is set within a range which the back cushion of a seat can come in or enter, the position of the back cushion of the seat is detected by a position detection part which is composed of a seat position sensor and a seat reclining sensor (shown at 75 and 76, respectively, in FIG. 2). Here, note that as long as the back cushion of the seat comes in the object detection area, the passenger may be assumed to lie or exist at a location forwardly of the object detection area, so that the system or apparatus is put into a sleeping state.

As is clear from the above, by defining or limiting the object detection area in an appropriate manner, it is possible to reduce misjudgments in the passenger existence area and the load of the system or apparatus as well.

Embodiment 2.

Figure 6A:
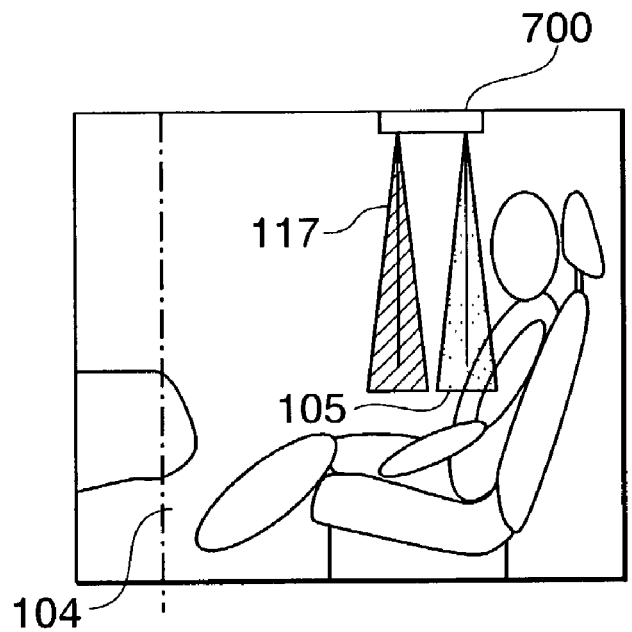
FIGS. 6A and 6B are a side elevational view and a front elevational view, respectively, showing a detection example in a passenger protection apparatus according to a second embodiment of the present invention.
Figure 6B:
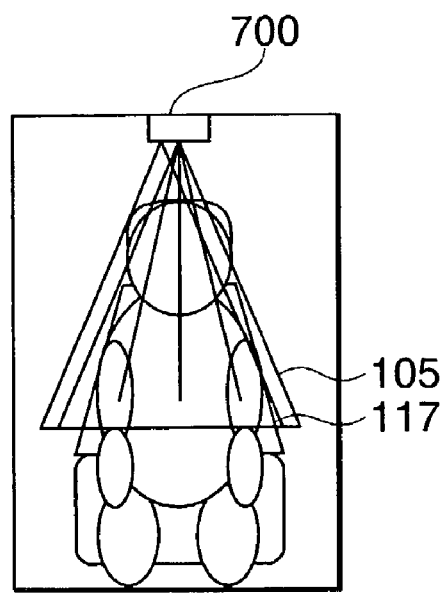

A second embodiment of the present invention includes an object detection region comprising a plurality of object detection areas, each of which is the one of the above-mentioned first embodiment. It is assumed that a passenger protection apparatus according to this embodiment has two object detection areas, that is, a first object detection area 105 and a second object detection area 117, for instance, as shown in FIGS. 6A and 6B. Note that FIG. 6A is a side elevational view of a passenger including the first object detection area 105 and the second object detection area 117, and FIG. 6B is a front elevational view thereof.

FIG. 7 is a flow chart showing the outline of processing in this second embodiment. As shown in FIG. 7, after the passenger protection apparatus is actuated, pieces of first distance data $L_{11-1n}$ of the first object detection area 105 and pieces of second distance data $L_{21-2n}$ of the second object detection area 117 are sequentially acquired by a range sensor 700 including two rows of n pieces of object detection sensors in step 106 and in step 118, respectively. The pieces of first and second distance data $L_{11-1n}$, $L_{21-2n}$ thus acquired are stored in the memory 50c in step 107 and in step 119, respectively, and they are used to detect objects in the first and second object detection areas in step 108. In step 120, there is generated an air bag control signal corresponding to either one of the first and second object detection areas 105, 117 in which an object has been detected. Here, when an object has been detected in the second object detection area 117, an air bag control signal of low risk expansion with a reduced expansion or deployment force is generated in step 121, whereas when an object has been detected in the first object detection area 105, an air bag control signal of expansion permission or enabling is generated in step 111. In other cases, an air bag control signal of expansion prohibition or disabling is generated in step 110.

An air bag control signal after generated is sent to the air bag control ECU 102 in step 112, and the presence or absence of a vehicle collision is determined in step 113. Only when there is no collision, a return to step 118 is performed, whereas when there is a collision, a return to step 106 is performed so that an object in the first detection area 105 alone can be detected. However, when there exists a passenger 34 in the first object detection area 105 or in the second object detection area 117, the presence or absence of a vehicle collision is determined in step 113 as shown on the right in FIG. 7. Only in the absence of a collision, a return to step 118 is carried out, whereas in the presence of a collision, an expansion permission or enabling signal is generated and the operation of the system or passenger protection apparatus is then terminated.

The reason why object detection is carried out in the first area 105 alone when there is no passenger in the object detection areas in the presence of a collision is as follows. That is, in this case, it is thought that a change in the air bag control signal is caused only when a passenger lying rearwardly of the first area 105 in the vehicle moves into the first area 105 thereby to change the air bag control signal from expansion prohibition into expansion permission, and hence it is thought to be unnecessary to perform object detection in the second area 117. Therefore, the detection in the second area 117 is omitted to improve the processing speed and reduce the amount of arithmetic calculations as well. In addition, a determination as to whether there exists a passenger in the object detection areas may be made only when a collision interrupt occurs. The reason why the operation of the system or passenger protection apparatus is terminated is similar to that in the first embodiment. Thus, the air bag control can be performed in three or more stages such as by low risk expansion with a reduced expansion force in addition to two stages (expansion permission and prohibition).

Embodiment 3.

In a third embodiment of the present invention, the object detection means of the above-mentioned first or second embodiment is constructed in the following manner. With such a construction, a specific portion of concern such as the head, breast, etc., of a passenger can be distinguished or discriminated from other objects such as a newspaper, the hands of the passenger, etc., in an easy manner without employing other additional sensors and increasing the amount of arithmetic calculations, thus making it possible to perform air bag expansion control with higher accuracy and on a safer side than the first and second embodiments.

In distinguishing the head of a passenger from others, when there is a change in the distance data of any of the object detection sensors from their initial value, it is determined that there is an object in the detection area of the concerned sensor as in the first and second embodiments. Since there are two object detection areas in the second embodiment, however, there is a possibility that objects exist in the two areas at the same time. Thus, when there exist objects in the first and second object detection areas 105, 117 at the same time, assuming that there is no object existing rearwardly of a passenger, it is determined that the object lying in the more rearward one of the two areas is a passenger.

FIG. 8 is a flow chart that shows the outline of processing according to the third embodiment of the present invention. Here, in addition to the object detection means in step 108, provision is made for an object position determination means for determining the positions of objects existing in the two areas at the same time in step 10 as a result of an object detection operation of the object detection means.

As shown in FIG. 9, the positions of the detected objects are divided into four cases A1, A2, B1 and B2 according to the results of object detection in the first area 105 or in the second area 117. Assuming that the object existing in the rearmost area in the vehicle is a passenger, determinations are made as follows: in cases A1 and A2, there exists an object in the first area 105; in case B1 there exists an object in the second area 117; and in case B2, there exists no passenger. Here, note that when a passenger exists in the first area 105, the air bag control signal becomes expansion permission, and when a passenger exists in the second area 117, the air bag control signal becomes low risk expansion, and when there is no passenger in the first and second areas 105, 117, the air bag control signal becomes expansion prohibition. In addition, typical patterns for A1, A2, B1 and B2, respectively, are as shown in FIG. 9.

In case of A1 and A2, the estimated position of the passenger is in the first area 105, and the actual position of the passenger is within or rearwardly of the first area 105, and hence the air bag is permitted to expand without any problem. In case of B1 the estimated position of the passenger is in the second area 117, and the actual position of the passenger is within the second area 117 or rearwardly of the first area 105. However, in cases where the passenger exists at a location rearwardly of the first area 105 in which the air bag is intrinsically permitted to expand, it is considered that hands of the passenger or the like other than the head thereof may come in the second area 117, so there will be no large damage even if it is assumed that the passenger exists in the vicinity of the first area 105 with the air bag being permitted to perform low risk expansion. In case of B2, the estimated position of the passenger is none due to the absence of any passenger, and the actual position of the passenger is forwardly of the second area 117, or rearwardly of the first area 105, or none (no passenger). However, in case where the passenger exists rearwardly of the first area 105 in the vehicle, the air bag control signal may be changed from expansion prohibition into expansion permission when the passenger comes in the first area 105 even after a collision. Accordingly, by the addition of the second object detection area 117, it becomes possible to select the low risk expansion without impairing safety in the case of employing the first object detection area 105 alone, thus making it possible to perform more suitable air bag expansion control. Here, note that regarding an air bag having a multistage inflator, it is preferable that a first stage inflation or expansion be operated when low risk expansion is selected, and in case where a passenger lies at a location rearwardly of the first area 105 in case of B1, it is further preferable that a second stage inflation or expansion be operated when the passenger comes in the first area 105 after the selection of the low risk expansion.

Embodiment 4.

In a fourth embodiment of the present invention, the object position determination means of the above-mentioned third embodiment is constructed in the following manner. In distinguishing a passenger (the head, breast, etc.) from others, when there is a change in the distance data of any of object detection sensors from their initial value, the object position determination means determines that there is an object in the detection area of the concerned sensor, as in the third embodiment. Similarly, when there exist objects in the two areas at the same time, it is determined that the object existing in one of the areas farther from the air bag expansion surface is a passenger including his or her head. In addition, here, the time series movements of the objects are recognized based on the results of object detection in the respective object detection areas stored in the memory, and the existence of objects in areas including therein no object detection area is grasped.

Assuming that the present object position determined by the system based on the present range sensor (object detection sensor) data is P and that the last passenger position determined one cycle before by the system based on the last range sensor data measured one cycle before and a previous passenger position determined two cycle before is Pb, FIG. 10 shows the present passenger position estimated from the present object position P and the last passenger position Pb determined one cycle before. With the present object position P determined based on the present range sensor data, when there exists an object in the first object detection area 105, the detected object is assumed to exist in "the first area", and when there exists an object in the second object detection area 117, the detected object is assumed to exist in "the second area", and when there is no object detected, the detected object is assumed to be "none" (the absence of an object). However, when there exist objects in both the first object detection area 105 and the second object detection area 117, one of the objects lying rearwardly of the other is a passenger (e.g., passenger's head) and hence the present position of the passenger for example, as in the third embodiment. Moreover, with the last passenger position Pb determined one cycle before based on the last range sensor data measured one cycle before and the previous passenger position determined two cycles before, when it is estimated that there exists an object in the first object detection area 105, the estimated object is assumed to exist in "the first area", or when it is estimated that there exists an object in the second object detection area 117, the estimated object is assumed to exist in "the second area", or when it is estimated that there exists an object rearwardly of the first area 105 in the vehicle, the estimated object is assumed to exist "after the first area". On the other hand, with the same or last passenger position Pb, when it is estimated that there exists an object forwardly of the second area 117, the estimated object is assumed to exist "before the second area", and when it is estimated that there exist no passenger in the first and second detection areas, it is assumed "the absence of a passenger".

FIG. 11 is a flow chart that shows the outline of processing according to the fourth embodiment. With respect to the passenger positions determined by the object position determination means in step 10, the last passenger position determined one cycle before and the present passenger position are held or stored every time by a passenger position storage means in step 122. With the above arrangement, it is possible to easily ascertain or grasp a passenger or the head thereof existing outside the object detection areas and reduce misjudgments due to passenger's hands, a newspaper or the like without increasing additional sensors other than the range sensor an the crash sensor and the amount of arithmetic calculations.

For instance, with $X$·a in FIG. 10, the last passenger position Pb is forwardly of the second area 117 and hence it is impossible for the passenger to move to the first area 105 in one cycle. Thus, in this case, assuming that there is no object rearwardly of the passenger in the vehicle, the last passenger position Pb would be a determination error or mistake, and the first area 105 with the present passenger position P existing therein becomes the correct position of the passenger. In addition, with $X$·b in FIG. 10, the last passenger position Pb is rearwardly of the first area 105 in the vehicle and hence it is impossible for the passenger to move to the second area 117 in one cycle. Therefore, in this case, the present passenger position P becomes a determination error or mistake (e.g., misdetection of a hand, a newspaper, etc.), and the correct position of the passenger becomes rearwardly of the first area 105 in which the last passenger position Pb exists.

Embodiment 5.

Figure 12A:
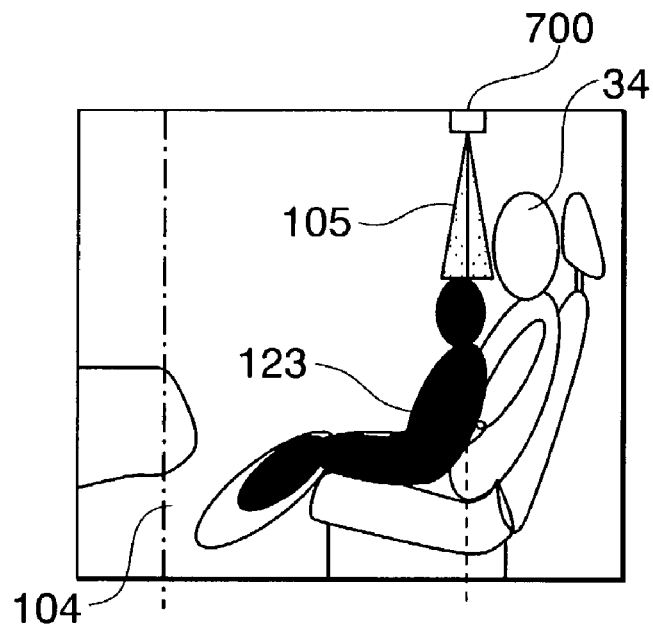
FIGS. 12A and 12B are views explaining the detection of objects according to a fifth embodiment of the present invention.
Figure 12B:
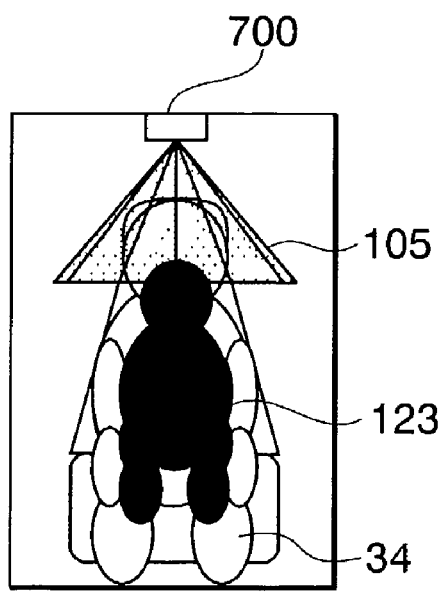

In a fifth embodiment of the present invention, the object detection areas in the above-mentioned first through fourth embodiments are changed in the following manner. Regarding air bag control, in addition to the concept that it is safer to prohibit the expansion or deployment of an air bag against a passenger lying in a dangerous area (i.e., at too short a distance from the air bag), there is another idea that it is on the safe side not to expand or deploy an air bag at all for children in general. Therefore, it is assumed that a six-year-old child dummy 123 is a standard child, as shown in a side elevational view in FIG. 12A and in a front elevational view in FIG. 12B, and an object detection area is set to exclude the head of the six-year-old child dummy seated in usual posture.

With such an arrangement, it is possible to protect a child of normal posture in a reliable and safe manner.

Embodiment 6.

In a sixth embodiment of the present invention, the object detection areas in which the air bag control signal is made into expansion permission or the object detection area in which the air bag control signal is made into low risk expansion in the above-mentioned first through fifth embodiments are changed in the following manner depending upon the presence or absence of brake application before collision.

Figure 13A:
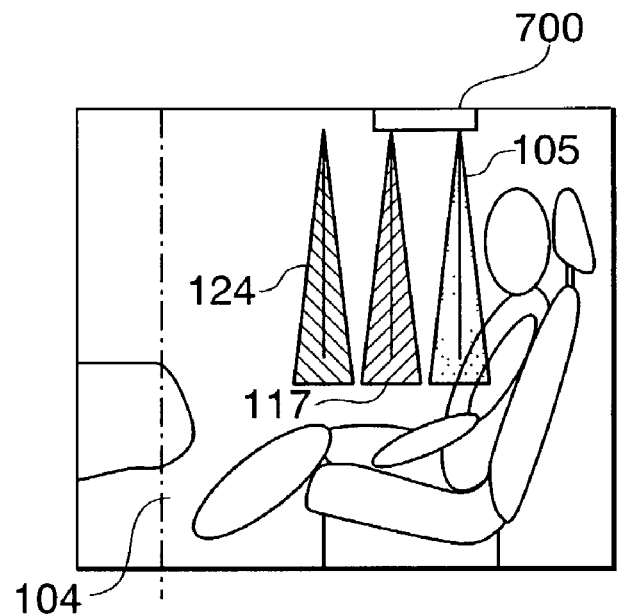
FIGS. 13A and 13B are views showing a detection example of a passenger protection apparatus according to a sixth embodiment of the present invention.
Figure 13B:
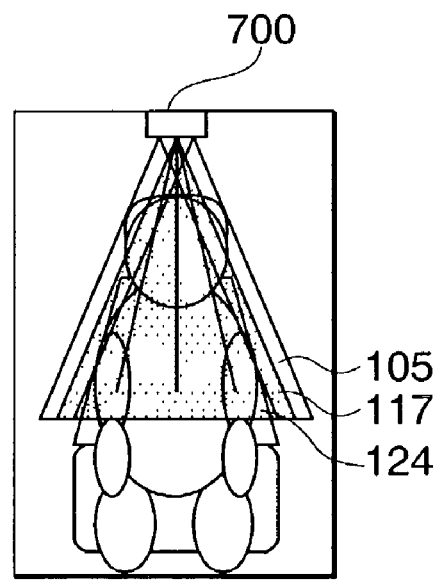

When no brake is applied before a collision of a vehicle, an upper part of the passenger's body moves with the vehicle and hence is not thrown out in a forward direction toward the air bag expansion surface during the time (about several tens of milliseconds) starting from the point in time of the collision until the speed of the vehicle becomes near to almost 0 km/h. Therefore, as shown in a side elevational view in FIG. 13A and in a front elevational view of FIG. 13B, a third object detection area as set in a manner shown at 124 is provided in addition to the first area 105 and the second area 117. On the other hand, in case of non-application of brakes before the collision, when a passenger is continuously existing in the same area from before the collision and within a predetermined period of time from the time point of the collision, the third area 124 in which the expansion of the air bag is usually prohibited is made to function as a low risk expansion area. However, note that the third area 124 is arranged rearwardly of a position at which an impact is considered to be the greatest at the instant when the air bag is expanded.

Figure 14:
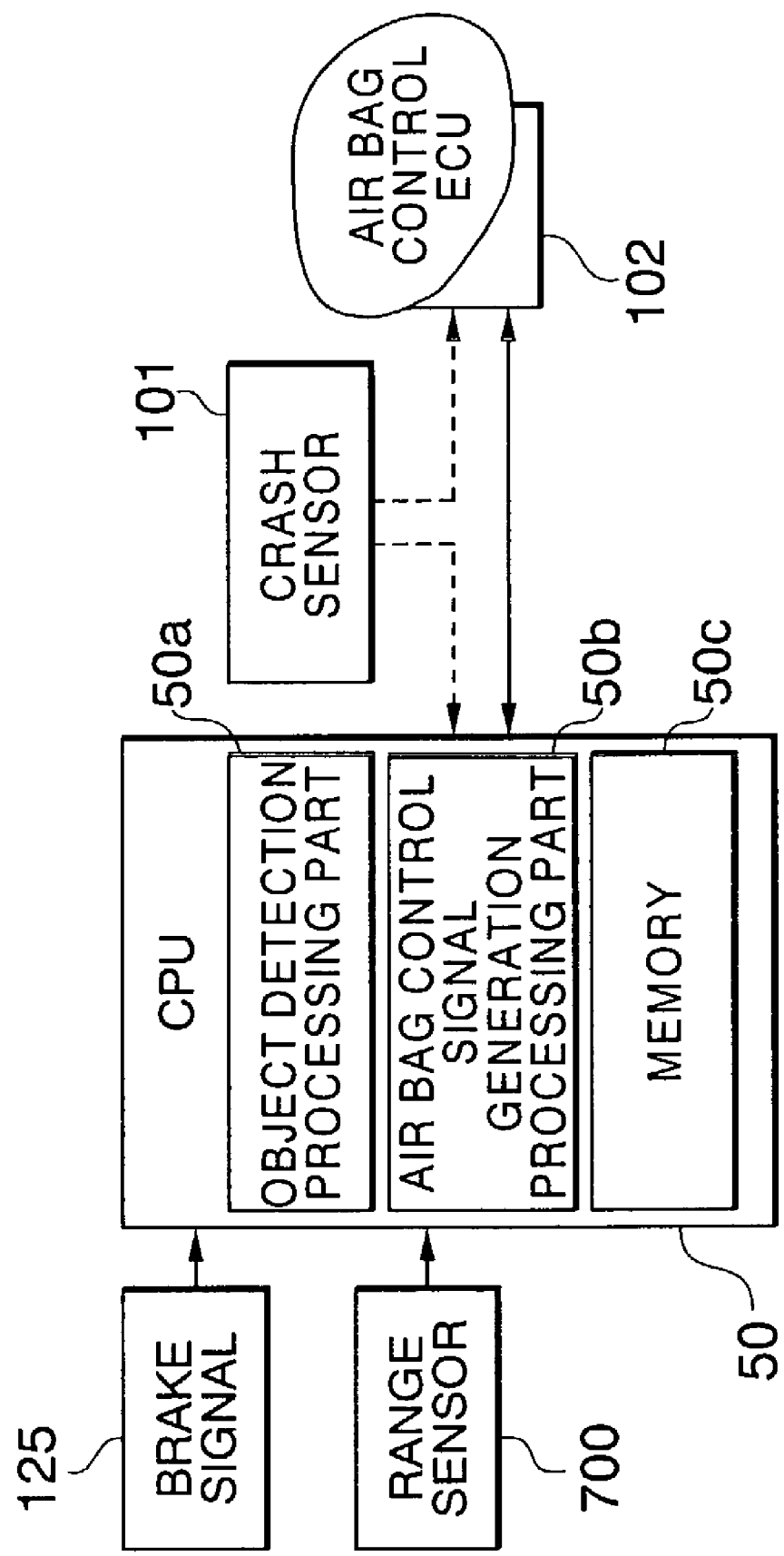
FIG. 14 is a view showing the configuration of the passenger protection apparatus according to the sixth embodiment of the present invention.
Figure 15:
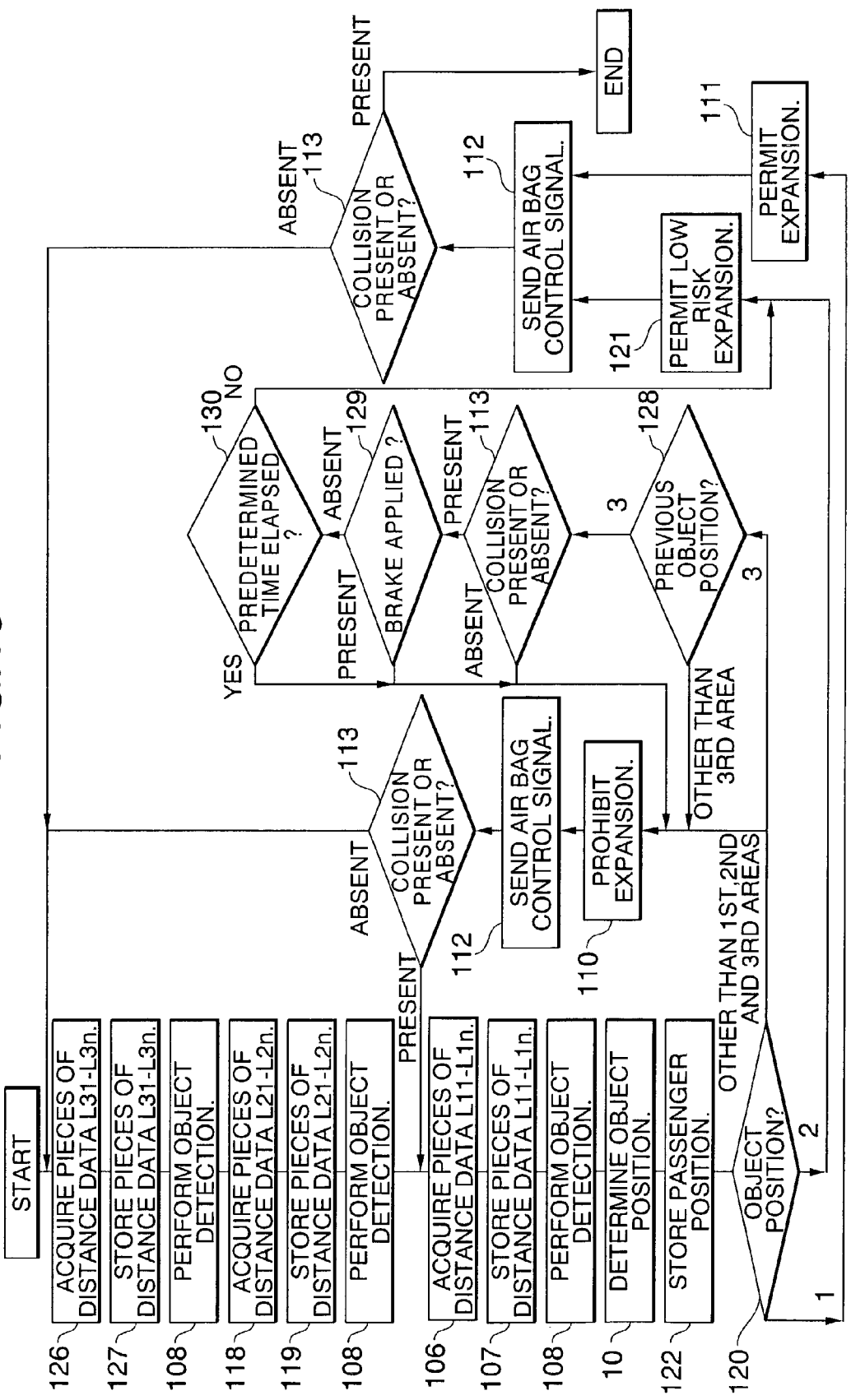
FIG. 15 is a flow chart illustrating the outline of processing according to the sixth embodiment of the present invention.
Figure 16:
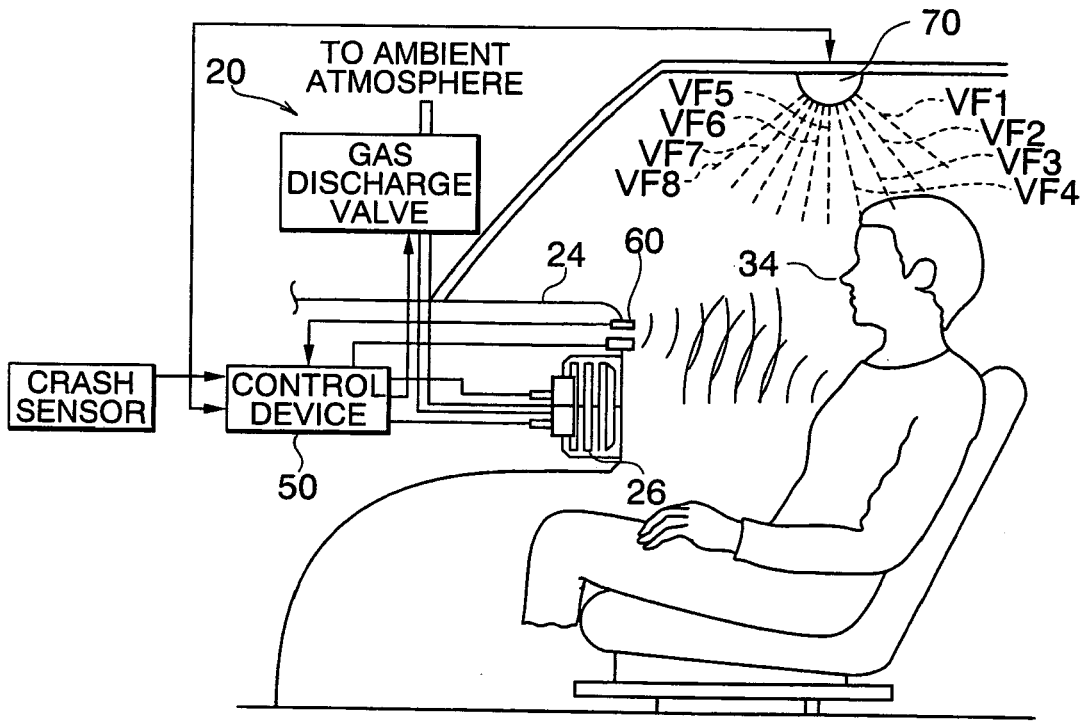
FIG. 16 is a view showing one example of the configuration of a conventional passenger protection apparatus.
Figure 17:
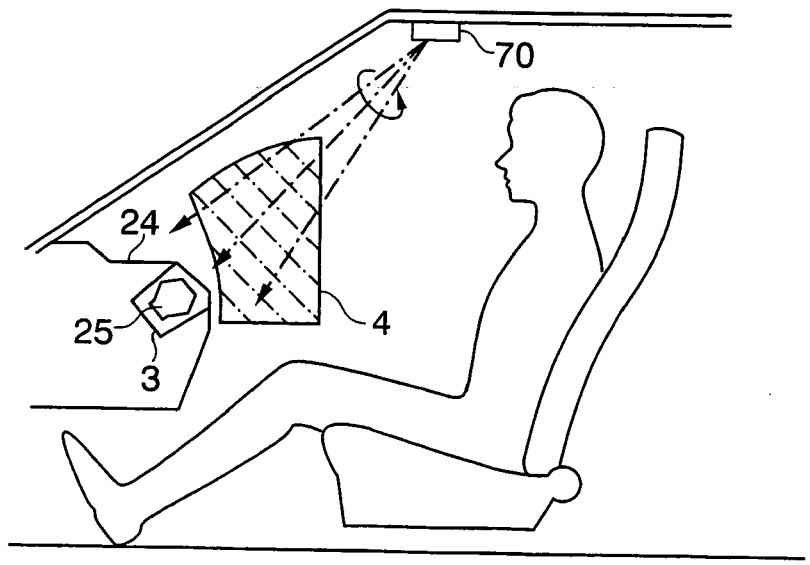
FIG. 17 is a view showing an example of the configuration of another conventional passenger protection apparatus.

FIG. 14 is a view showing the configuration of the passenger protection apparatus according to the sixth embodiment of the present invention, in which a symbol 125 represents a vehicle brake signal. FIG. 15 is a flow chart showing the outline of processing according to the sixth embodiment. As shown in the flow chart of FIG. 15, pieces of distance data $L_{3_1-3_n}$ in the third object detection area 124 are sequentially acquired in step 126. Then in step 127, the pieces of acquired distance data $L_{3_1-3_n}$ are stored in the memory 50c as in the other detection areas, and they are used to detect objects in the third object detection area 124 in step 108. The object detection results of step 108 are used by the object position determination means in step 10. When the position of an object is in the third area 124, the last position of the object (step 128), the presence or absence of a collision (step 113), the presence or absence of brake application before the collision (step 129, which together with a brake signal 125 constitutes a brake detection part), and the elapse of a predetermined time from the collision (step 130) are determined. Thus, the passenger is not thrown out toward the air bag expansion surface, as described above in detail. If it is determined that there is no danger even in the presence of the passenger in the third area 124, the low risk expansion is selected. With the above arrangement, it is possible to perform suitable air bag control with respect to a passenger who is not thrown out in the forward direction of the vehicle within a predetermined period of time from a collision when there is no brake application before the collision.

As described above, the present invention provides the following excellent advantages.

A passenger protection apparatus according to the present invention includes: a collision detection part for detecting a collision of a vehicle; an object detection part for detecting the existence of an object in a predetermined object detection region disposed rearwardly of an air bag installation surface in the vehicle based on a signal from a sensor; and an air bag control signal generation part for generating an air bag control signal to control the expansion of an air bag based on the detection results of the object detection part and the collision detection part. The air bag control signal generation part makes the air bag control signal into a control signal of expansion permission only when there exists an object in the object detection region at the instant when the collision of the vehicle is detected or within a predetermined period of time from the point in time of the collision of the vehicle. With the above arrangement, it is possible not only to suppress the expansion of the air bag for a passenger lying in a dangerous area but also to carry out air bag control for a passenger lying in a safe area without performing complicated arithmetic calculations.

Preferably, the object detection region includes a plurality of object detection areas which are different in their distances from the air bag installation surface; the object detection part detects the existence of an object in each of the plurality of object detection areas. The air bag control signal generation part makes the air bag control signal into a control signal of low risk expansion to weaken the expansion force of the air bag when an object in an object detection area of a predetermined distance or less from the air bag installation surface is detected by the object detection part. The air bag control signal generation part makes the air bag control signal into a control signal of expansion permission when an object is detected in an object detection area of more than a prescribed distance from the air bag installation surface. With the above arrangement, it is possible to perform air bag control in a more finely staged manner in addition to two stages of expansion permission and prohibition.

Preferably. when the existence of objects in two or more object detection areas is detected, the object detection part determines that an object existing in the rearmost one of the object detection areas in the vehicle is a passenger. Thus, it is possible to easily distinguish the head of a passenger from other objects without increasing other additional sensors and/or the amount of arithmetic calculations.

Preferably, when time series object existence areas detected in at least two longitudinally continuously disposed object detection areas have moved from a forward area to a rearward area of the vehicle, the object detection part determines that the passenger has moved in a rearward direction of the vehicle, and in the reverse case, the object detection part determines that the passenger has moved in a forward direction of the vehicle. Thus, it is possible to easily grasp the head of a passenger lying outside the object detection areas without increasing other additional sensors and/or the amount of arithmetic calculations.

Preferably, when time series object existence areas detected in at least two longitudinally continuously disposed object detection areas have moved in a random order, the object detection part determines that the objected detected is not a passenger. Thus, it is possible to distinguish the head of a passenger from other objects in an easy and accurate manner without increasing other additional sensors and/or the amount of arithmetic calculations.

Preferably, the passenger protection apparatus further includes a position detection part for detecting the position of a back cushion of a seat, wherein the object detection part enlarges a rear end of the object detection region in a rearward direction of the vehicle according to the position of the seat within a range in which the back cushion of the seat can not be detected. Thus, by limiting the object detection areas in an appropriate manner, it is possible to reduce misjudgments of passenger existence areas, and by properly restricting the object detection areas, it is possible to reduce the load of the system or apparatus as well.

Preferably, the object detection part sets a lower end of the object detection region at a position higher than the height of the head of a six-year-old child dummy for use with a collision test seated on the seat. Thus, a child in normal posture can be protected in a reliable and safe manner.

Preferably, the passenger protection apparatus further includes a brake detection part for detecting the presence or absence of brake application before the collision of the vehicle. The object detection region includes an object detection area of expansion permission in which the air bag expansion control signal is made into expansion permission, and a object detection area of low risk expansion in which the air bag expansion control signal is made into low risk expansion. When there is no brake application before the collision of the vehicle, the air bag control signal generation part enlarges the object detection area of expansion permission or the object detection area of low risk expansion in a forward direction of the vehicle by a predetermined distance from a usual position thereof for a predetermined period of time from the time at which the collision of the vehicle is detected. Thus, it is possible to perform air bag control according to the presence or absence of brake application before a collision.

While the invention has been described in terms of preferred embodiments, those skilled in the art will recognize that the invention can be practiced with modifications within the spirit and scope of the appended claims.

What is claimed is:

1. A passenger protection apparatus comprising:
    a collision detection part for detecting a collision of a vehicle;
    an object detection part for detecting the existence of an object in a predetermined object detection region disposed rearwardly of an air bag installation surface in the vehicle based on a signal from a sensor; and
    an air bag control signal generation part for generating an air bag control signal to control the expansion of an air bag based on the detection results of said object detection part and said collision detection part;
    wherein said air bag control signal generation part makes, by referencing detection results of said collision detection part and said object detection part cyclically, the air bag control signal into a control signal of expansion permission only when there exists an object in said object detection region at the instant when the collision of the vehicle is detected or within a period of time from the point in time of the collision of the vehicle to when the object moves from a non-detection region to said object detection region due to the collision.

2. The passenger protection apparatus according to claim 1, wherein:
    said object detection region comprises a plurality of object detection areas which are different in their distances from said air bag installation surface; said object detection part detects the existence of an object in each of said plurality of object detection areas;
    said air bag control signal generation part makes the air bag control signal into a control signal of low risk expansion to weaken the expansion force of said air bag when an object in an object detection area of a predetermined distance or less from said air bag installation surface is detected by said object detection part; and
    said air bag control signal generation part makes the air bag control signal into a control signal of expansion permission when an object is detected in an object detection area of more than a prescribed distance from said air bag installation surface.

3. The passenger protection apparatus according to claim 2, wherein when the existence of objects in two or more object detection areas is detected, said object detection part determines that an object existing in the rearmost one of said object detection areas in the vehicle is a passenger.

4. The passenger protection apparatus according to claim 2, wherein when time series object existence areas detected in at least two longitudinally continuously disposed object detection areas have moved from a forward area to a rearward area of the vehicle, said object detection part determines that the passenger has moved in a rearward direction of the vehicle, and in the reverse case, said object detection part determines that the passenger has moved in a forward direction of the vehicle.

5. The passenger protection apparatus according to claim 3, wherein when time series object existence areas detected in at least two longitudinally continuously disposed object detection areas have moved from a forward area to a rearward area of the vehicle, said object detection part determines that the passenger has moved in a rearward direction of the vehicle, and in the reverse case, said object detection part determines that the passenger has moved in a forward direction of the vehicle.

6. The passenger protection apparatus according to claim 2, wherein when time series object existence areas detected in at least two longitudinally continuously disposed object detection areas have moved in a random order, said object detection part determines that the objected detected is not a passenger.

7. The passenger protection apparatus according to claim 3, wherein when time series object existence areas detected in at least two longitudinally continuously disposed object detection areas have moved in a random order, said object detection part determines that the objected detected is not a passenger.

8. The passenger protection apparatus according to claim 4, wherein
    when time series object existence areas detected in at least two longitudinally continuously disposed object detection areas have moved in a random order, said object detection part determines that the objected detected is not a passenger.

9. The passenger protection apparatus according to claim 1, further comprising a position detection part for detecting the position of a back cushion of a seat, wherein said object detection part determines a rear end of said object detection region according to the position of the back cushion of the seat.

10. The passenger protection apparatus according to claim 2, further comprising a position detection part for detecting the position of a back cushion of a seat, wherein said object detection part determines a rear end of said object detection region according to the position of the back cushion of the seat.

11. The passenger protection apparatus according to claim 3, further comprising a position detection part for detecting the position of a back cushion of a seat, wherein said object detection part enlarges a rear end of said object detection region in a rearward direction of the vehicle according to the position of the seat within a range in which the back cushion of the seat can not be detected.

12. The passenger protection apparatus according to claim 4, further comprising a position detection part for detecting the position of a back cushion of a seat, wherein said object detection part enlarges a rear end of said object detection region in a rearward direction of the vehicle according to the position of the seat within a range in which the back cushion of the seat can not be detected.

13. The passenger protection apparatus according to claim 1, wherein said object detection part sets a lower end of the object detection region at a position higher than the height of the head of a six-year-old child dummy for use with a collision test seated on the seat.

14. The passenger protection apparatus according to claim 2, wherein said object detection part sets a lower end of the object detection region at a position higher than the height of the head of a six-year-old child dummy for use with a collision test seated on the seat.

15. The passenger protection apparatus according to claim 3, wherein said object detection part sets a lower end of the object detection region at a position higher than the height of the head of a six-year-old child dummy for use with a collision test seated on the seat.

16. The passenger protection apparatus according to claim 4, wherein said object detection part sets a lower end of the object detection region at a position higher than the height of the head of a six-year-old child dummy for use with a collision test seated on the seat.

17. The passenger protection apparatus according to claim 1, further comprising a brake detection part for detecting the presence or absence of at brake application before the collision of the vehicle, wherein said object detection region includes an object detection area of expansion permission in which the air bag expansion control signal is made into expansion permission, and a object detection area of low risk expansion in which the air bag expansion control signal is made into low risk expansion, and when there is no brake application before the collision of the vehicle, said air bag control signal generation part enlarges said object detection area of expansion permission or said object detection area of low risk expansion in a forward direction of the vehicle by a predetermined distance from a usual position thereof for a predetermined period of time from the time at which the collision of the vehicle is detected.

18. The passenger protection apparatus according to claim 2, further comprising a brake detection part for detecting the presence or absence of brake application before the collision of the vehicle, wherein said object detection region includes an object detection area of expansion permission in which the air bag expansion control signal is made into expansion permission, and a object detection area of low risk expansion in which the air bag expansion control signal is made into low risk expansion, and when there is no brake application before the collision of the vehicle, said air bag control signal generation part enlarges said object detection area of expansion permission or said object detection area of low risk expansion in a forward direction of the vehicle by a predetermined distance from a usual position thereof for a predetermined period of time from the time at which the collision of the vehicle is detected.

19. The passenger protection apparatus according to claim 3, further comprising a brake detection part for detecting the presence or absence of brake application before the collision of the vehicle, wherein said object detection region includes an object detection area of expansion permission in which the air bag expansion control signal is made into expansion permission, and a object detection area of low risk expansion in which the air bag expansion control signal is made into low risk expansion, and when there is no brake application before the collision of the vehicle, said air bag control signal generation part enlarges said object detection area of expansion permission or said object detection area of low risk expansion in a forward direction of the vehicle by a predetermined distance from a usual position thereof for a predetermined period of time from the time at which the collision of the vehicle is detected.

20. The passenger protection apparatus according to claim 4, further comprising a brake detection part for detecting the presence or absence of brake application before the collision of the vehicle, wherein said object detection region includes an object detection area of expansion permission in which the air bag expansion control signal is made into expansion permission, and a object detection area of low risk expansion in which the air bag expansion control signal is made into low risk expansion, and when there is no brake application before the collision of the vehicle, said air bag control signal generation part enlarges said object detection area of expansion permission or said object detection area of low risk expansion in a forward direction of the vehicle by a predetermined distance from a usual position thereof for a predetermined period of time from the time at which the collision of the vehicle is detected.

21. The passenger protection apparatus according to claim 1, wherein said object detection part comprises object detection sensors for detecting the distances of the objects from the ceiling of the vehicle in preset object detection areas, a memory storing detected distance data, and an object detection processing part which determines that an object exists in the object detection area when the distance data changes.

22. The passenger protection apparatus according to claim 9, wherein said position detection part for detecting the position of the back cushion of the seat comprises a seat position sensor and a seat reclining sensor.

23. The passenger protection apparatus according to claim 10, wherein said position detection part for detecting the position of the back cushion of the seat comprises a seat position sensor and a seat reclining sensor.

* * * * *